United States Patent [19]
Toyoda et al.

[11] Patent Number: 5,466,488
[45] Date of Patent: Nov. 14, 1995

[54] METHOD OF MAKING GLAZED AlN SUBSTRATE WITH AN $AL_2O_3$-$SIO_2$ INTERFACIAL LAYER

[75] Inventors: Seiji Toyoda; Kunio Sugamura, both of Saitama; Hideaki Yoshida, Tokyo, all of Japan

[73] Assignee: Mitsubishi Materials Corporation, Tokyo, Japan

[21] Appl. No.: 193,291

[22] Filed: Feb. 8, 1994

[30]   Foreign Application Priority Data

Feb. 8, 1993 [JP]  Japan ................................ 5-043267

[51] Int. Cl.⁶ ..................................................... B05D 3/02
[52] U.S. Cl. .................. 427/376.2; 427/377; 427/377.7; 427/419.1
[58] Field of Search ............................. 427/376.2, 377, 427/397.7, 419.1

[56]   References Cited

U.S. PATENT DOCUMENTS

| | | |
|---|---|---|
| 4,517,584 | 5/1985 | Matsushita et al. ...................... 357/80 |
| 4,659,611 | 4/1987 | Iwase et al. ............................. 428/209 |
| 5,087,509 | 2/1992 | Kuromitsu et al. ...................... 428/195 |
| 5,096,768 | 3/1992 | Kuromitsu et al. ...................... 428/209 |
| 5,184,399 | 2/1993 | Ueno et al. .............................. 29/84.6 |
| 5,213,877 | 5/1993 | Yoshida et al. ......................... 428/209 |

*Primary Examiner*—Benjamin Utech
*Attorney, Agent, or Firm*—Vineet Kohli; Thomas R. Morrison

[57]   ABSTRACT

A glazed AlN substrate includes: a sintered AlN body, a surface oxidized layer formed on the sintered AlN body, an $Al_2O_3$—$SiO_2$ layer formed on top of the intermediate surface oxidized layer, and a glass layer formed on top of the $Al_2O_3$—$SiO_2$ layer. In one embodiment, an additional $SiO_2$ layer is interposed between the glass layer and the $Al_2O_3$—$SiO_2$ layer. A method of producing the AlN substrate is also disclosed that permits firing of the glass layer at high temperatures.

18 Claims, 2 Drawing Sheets

METHOD OF MAKING GLAZED AlN SUBSTRATE WITH AN AL$_2$O$_3$-SIO$_2$ INTERFACIAL LAYER

BACKGROUND OF THE INVENTION

This invention relates to a glazed aluminum nitride (AlN) substrate suitable for use in applications such as thermal heads of a thermal recording device, thin film circuits, thick film circuits, and the like.

A glazed ceramic substrate, in which the unevenness of the ceramic substrate is eliminated by thinning and coating glass on the surface, is used, for example, in a thermal head of a thermal recording system. In such a thermal recording system, a thermal head is held in close contact with a thermally sensitive paper. By generating heat, a thermal resistor incorporated within the thermal head imprints a record on the thermally sensitive paper.

A glazed ceramic substrate is also widely used in thin-film circuit substrates. Because a high-frequency device is generally mounted on the substrate, a circuit substrate in a thin film hybrid IC must have a smooth surface. It must also have the properties of high precision, low noise, and the like. Such a glazed ceramic substrate may further be used in a thick-film circuit substrate to improve its properties.

By using as a substrate material a sintered AlN body having a greater thermal conductivity, the heat radiating property of the resultant glazed AlN substrate is improved. However, when the glazing material on an Al$_2$O$_3$ substrate is a glass, such as an oxide glass of SiO$_2$—B$_2$O$_3$Al$_2$O$_3$—CaO, applied and formed by firing on the sintered AlN body, the glass layer breaks easily.

This fragility is due to the large difference in the coefficient of thermal expansion between the sintered AlN body and the glass layer. To prevent breakage of this nature, a glass having a relatively small coefficient of thermal expansion that approximates the coefficient of thermal expansion of the sintered AlN body has been proposed. However, using such a glass introduces an additional problem. A glass with a smaller coefficient of thermal expansion also has a higher softening point. Such a glass thus requires firing at elevated temperatures to secure the surface smoothness of the glass layer. Firing at elevated temperatures increases reactivity between the sintered AlN body and the glass layer. Bubbles generated by the resulting reaction produce unevenness, including blisters, on the surface of the glass layer, thereby adversely affecting the surface smoothness of the glass layer.

To prevent a reaction between the sintered AlN body and the glass layer, a glazed AlN substrate may be prepared by forming an SiO$_2$ layer on the surface of the sintered AlN body through a surface oxidized layer. The glass layer adheres to the SiO$_2$ layer, which prevents any undesirable reaction between the sintered AlN body and the glass layer.

The thickness of SiO$_2$ layer is increased to correspond to that of the glass layer. As the thickness of the SiO$_2$ layer is increased, there is an increased likelihood that shrinking cracks may occur in the SiO$_2$ layer during the process of fire-forming. When these cracks occur, the glass component of the glass layer penetrates the sintered AlN body at the time the glass layer is fired at an elevated temperature. The result is a violent reaction, between the glass and the sintered AlN body, that produces bubbles in the glass layer. As a consequence, where a thicker glass layer is desired, it is difficult to form it by firing at elevated temperatures without adversely affecting its surface smoothness.

OBJECTS AND SUMMARY OF THE INVENTION

Accordingly, it is an object of the present invention to provide a glazed AlN substrate that permits a glass layer with a high softening point to be formed by firing at elevated temperatures without being affected by its thickness.

Briefly stated, a glazed AlN substrate includes: a sintered AlN body, a surface oxidized layer formed on the sintered AlN body, an Al$_2$O$_3$—SiO$_2$ layer formed on top of the intermediate surface oxidized layer, and a glass layer formed on top of the Al$_2$O$_3$—SiO$_2$ layer. In one embodiment, an additional SiO$_2$ layer is interposed between the glass layer and the Al$_2$O$_3$—SiO$_2$ layer. A method of producing the AlN substrate is also disclosed that permits firing of the glass layer at high temperatures.

In accordance with these and other objects of the invention, a glazed AlN substrate includes: a sintered AlN body, a surface oxidized layer on the sintered AlN body, a laminated Al$_2$O$_3$—SiO$_2$ layer on the surface oxidized layer, and a glass layer on the Al$_2$O$_3$—SiO$_2$ layer.

According to feature of the invention, a glazed AlN substrate includes: an sintered AlN body, a surface oxidized layer on the sintered AlN body, a laminated Al$_2$O$_3$—SiO$_2$ layer on the surface oxidized layer, a SiO$_2$ layer formed on the Al$_2$O$_3$—SiO$_2$ layer, and a glass layer on the SiO$_2$ layer.

According to a still further feature of the invention, a method of producing a glazed AlN substrate includes: preparing a sintered AlN body; thermally oxidizing the sintered AlN body to form a surface oxidized layer thereon, wherein a resulting surface oxidized layer has a thickness of from about 0.2 to about 20 μm, laminating an Al$_2$O$_3$—SiO$_2$ layer on the surface oxidized layer, and forming a glass layer on the Al$_2$O$_3$—SiO$_2$ layer.

According to a still further feature of the invention, a method of producing a glazed AlN substrate includes: preparing a sintered AlN body, thermally oxidizing the sintered AlN body to form a surface oxidized layer thereon, laminating an Al$_2$O$_3$—SiO$_2$ layer on the surface oxidized layer, forming an SiO$_2$ layer on the Al$_2$O$_3$—SiO$_2$ layer, and forming a glass layer on the SiO$_2$ layer.

The above, and other objects, features and advantages of the present invention will become apparent from the following description read in conjunction with the accompanying drawings, in which like references numerals designate the same elements.

DETAILED DESCRIPTION OF PREFERRED EMBODIMENTS

Figure 1:
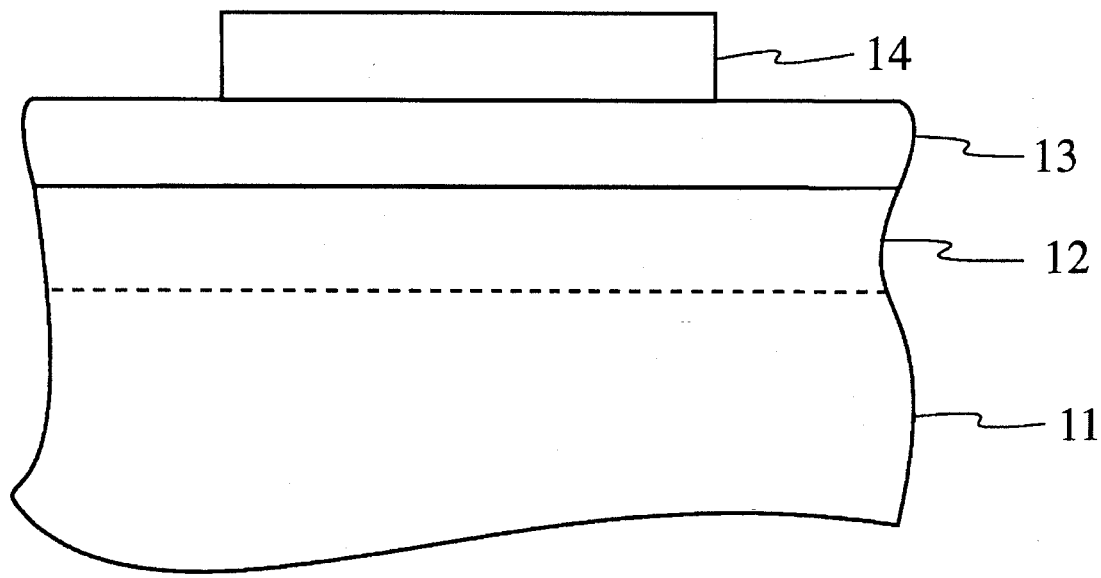
FIG. 1 is a cross-sectional view of a first embodiment of a glazed AlN substrate of the present invention.

Referring to FIG. 1, a glazed AlN substrate employs a sintered AlN body 11 has a thermal conductivity of at least 160 W/m. K and a coefficient of thermal expansion of about 4.4×10-6/°C. A main component of a surface oxidized layer 12 formed on a surface of sintered AlN body 11 is Al$_2$O$_3$. Surface oxidized layer 12 is obtained, for example, by oxidizing sintered AlN body 11 through heat treatment at a temperature of from about 1100° to about 1500° C., in an atmosphere containing oxygen and steam. Surface oxidized layer 12 has a thickness of 0.2 to 20 µm.

As a result, adhesion is improved between an $Al_2O_3$—$SiO_2$ layer 13 laminated on surface oxidized layer 12 and sintered AlN body 11. An $Al_2O_3$—$SiO_2$ layer 13 is formed on surface oxidized layer 12 by spin coating. A suspension of $Al_2O_3$—$SiO_2$ particles, in which $Al_2O_3$ and $SiO_2$ particles have the same size of 0.05 to 5 µm, is used. The suspension is dispersed, and $Al_2O_3$—$SiO_2$ layer 13 is formed by firing at a temperature of from 900° to 1400° C. $Al_2O_3$—$SiO_2$ layer 13 contains from about 20 to about 50% $Al_2O_3$ by weight percent, with the balance being substantially $SiO_2$., i.e., from about 50 to about 80%. The thickness of $Al_2O_3$—$SiO_2$ layer 13 is from about 0.2 to about 20 µm.

As a result of the foregoing, the compacting of $Al_2O_3$—$SiO_2$ layer 13 is promoted. At the same time, the strength of $Al_2O_3$—$SiO_2$ layer 13 is improved. In addition, adhesion is improved between $Al_2O_3$—$SiO_2$ layer 13 and surface oxidized layer 12, and a reaction is prevented between a glass layer 14 and sintered AlN body 11.

Glass layer 14, formed on $Al_2O_3$—$SiO_2$ layer 13, contains, by weight, 30 to 70% $SiO_2$, 10 to 40%, $Al_2O_3$, 1 to 10% $B_2O_3$, and 10 to 40% of a metal oxide "MO") selected from a group of MgO, CaO, SrO, BaO, ZnO, and PbO. The thickness of glass layer 14 is 30 µm or more.

Glass layer 14 may be formed in accordance with manufacturing methods usually used to produce glazed ceramic substrates. Examples of suitable methods include: screen-printing a glass paste on an AlN substrate, superimposing a sheet prepared by applying glass on a plastic film on an AlN substrate, and dipping an AlN substrate into an emulsion of glass. A substrate onto which a glazed layer is applied, by any one of these methods or the like, is formed by firing at a temperature of from about 1000° C. to about 1400° C. This results in the fusing of the interfaces of surface oxidized layer 12, $Al_2O_3$—$SiO_2$ layer 13, and glass layer 14 on sintered AlN body 11.

A fusing reaction between $Al_2O_3$—$SiO_2$ layer 13 and glass layer 14 results in close adhesion between sintered AlN body 11 and a glass layer 14A. Further, penetration of the glass component of glass layer 14 into sintered AlN body 11 is prevented by an increase in the viscosity of the glass adjacent to the interface between $Al_2O_3$—$SiO_2$ layer 13 and glass layer 14. Accordingly, glass layer 14 may be formed with a greater thickness and a high softening point by firing at elevated temperatures, while providing improved surface smoothness.

A coefficient of thermal expansion of glass layer 14 can be maintained within a range from about $3.4 \times 10^{-6}$ to about $5.4 \times 10^{-6}/°C$. Accordingly, any difference between the coefficients of thermal expansion of glass layer 14 and sintered AlN body 11 is reduced. This reduction helps prevent the exfoliation of glass layer 14 or the occurrence of cracks and fractures on its surface.

Adhesion of surface oxidized layer 12 to $Al_2O_3$—$SiO_2$ layer 13 is inadequate when the thickness of surface oxidized layer 12 is less than 0.2 µm. Conversely, when the thickness of surface oxidized layer 12 is greater than 20 µm, heat radiation of the glazed AlN substrate is reduced.

When the content of $Al_2O_3$ in $Al_2O_3$—$SiO_2$ layer 13 is greater than 50% by weight, and the content of $SiO_2$ in $Al_2O_3$—$SiO_2$ layer reaction, between the glass component of glass layer 14, softened by firing, and the $SiO_2$ component in $Al_2O_3$—$SiO_2$ layer 13, to decrease. As a result, penetration of glass layer 14, while in a softened state at elevated temperatures, into sintered AlN body 11 is promoted. The resulting reaction between glass layer 14 and sintered AlN body 11 may cause blisters on the surface of glass layer 14.

On the other hand, when the content of $Al_2O_3$ in $Al_2O_3$—$SiO_2$ layer 13 is less than 20% by weight, and the content of $SiO_2$ in $Al_2O_3$—$SiO_2$ layer 13 is greater than 80% by weight, the strength of $Al_2O_3$—$SiO_2$ layer 13 is reduced, causing exfoliation of $Al_2O_3$—$SiO_2$ layer 13 from the glazed AlN substrate by a heat cycle test. Further, this promotes the formation of cracks and fractures on the surface of $Al_2O_3$—$SiO_2$ layer 13 after firing, especially when the thickness of $Al_2O_3$—$SiO_2$ layer 13 is greater than 2 µm.

When the thickness of $Al_2O_3$—$SiO_2$ layer 13 is less than 0.2 µm, the amount of $SiO_2$ in $Al_2O_3$—$SiO_2$ layer 13 also decreases. This causes insufficient fusing between $Al_2O_3$—$SiO_2$ layer 13 and glass layer 14, while in a softened state at elevated temperatures, leading to the penetration of the glass component of glass layer 14 into sintered AlN body 11. The resulting reaction between the glass component of glass layer 14 and sintered AlN body 11 produces blisters on glass layer 14. Alternatively, when the thickness of $Al_2O_3$—$SiO_2$ layer 13 is greater than 20 µm, the heat radiation of the glazed AlN substrate decreases.

A reduction in size of $Al_2O_3$ and $SiO_2$ particles in $Al_2O_3$—$SiO_2$ suspension 13 to less than 0.05 µm causes the particles in the suspension to gather together, making it impossible to obtain a uniform dispersion. Conversely, when the size of $Al_2O_3$ and $SiO_2$ particles in $Al_2O_3$—$SiO_2$ layer 13 is greater than 5 µm, the sintering property is decreased because of the large particle size, making it impossible to obtain a compact $Al_2O_3$—$SiO_2$ layer 13.

Furthermore, when the composition of glass layer 14 is not within the foregoing limit, the coefficient of thermal expansion of glass is less than $3.4 \times 10^{-6}/°C$. or more than $5.4 \times 10^{-6}/°C$. Consequently, formation of glass layer 14 on sintered AlN body 11 causes exfoliation of glass layer 14 and formation of cracks and fractures on the surface of glass layer 14.

An increase in the amount of each of $SiO_2$, $Al_2O_3$, MgO, CaO, SrO, BaO, and ZnO raises the softening point of glass. For this reason, even if the formation of glass layer 14 by firing is conducted at a prescribed temperature (for example, of from about 1000° to about 1400° C.), the surface smoothness of glass layer 14, which requires its viscous flow, cannot be achieved, because of the high viscosity of the glass. Further, an increase in the amount of PbO raises the coefficient of thermal expansion of glass. This increase may cause the formation of cracks and fractures on the surface of glass layer 14. An increase in the ratio of $B_2O_3$ causes a phase splitting and does not permit forming a unified glass layer 14.

The first embodiment of the present invention is described in detail with reference to the following examples.

EXAMPLE 1

Sintered AlN body 11 was cut into a size of 50 mm ×50 mm×0.8 mm. Cut sintered AlN body 11 was then thermally oxidized at a temperature of 1300° C. to form surface oxidized layer 12 of $Al_2O_3$ having a thickness of 4.5 µm.

A suspension consisting of $Al_2O_3$ particles and $SiO_2$ particles was prepared. $Al_2O_3$—$SiO_2$ layer 13 with a thickness of 5.0 µm was formed on surface oxidized layer 12 of $Al_2O_3$ by spin-coating using the suspension and firing at a temperature of 1100° C. Table 1 shows the mean sizes and content ratios of $Al_2O_3$ particles and $SiO_2$ particles in the aforementioned suspension.

Glass paste was then printed on $Al_2O_3$—$SiO_2$ layer 13 by screen printing and fired at a temperature of 1200° C. The thickness of the glass layer after firing was from 40 to 50 μm. The chemical composition of glass used contained, by weight, 55% $SiO_2$; 15% $Al_2O_3$; 20% PbO; 5% $B_2O_3$; and 5% CaO.

The conditions of the interface between glass layer 14 and $Al_2O_3$—$SiO_2$ layer 13, and the surface property of glass layer 14, were evaluated for each glazed AlN substrate manufactured. This evaluation was performed by observing the cross sections and surfaces by scanning electron microscopy "SEM"). There was no indication that the glass component of softened glass layer 14 penetrated into sintered AlN body 11 in any of the glazed AlN substrates, except for Structure 1-1, Structure 1-5, Structure 1-6, Structure 1-9, Structure 1-10, and Structure 1-13. No bubbles were observed in glass layer 14. Furthermore, no unevenness, including blisters from the generation of bubbles, was found on the surface of glass layer 14.

The surface of glass layer 14 was evaluated by a roughness gauge. As shown in Table 1, the results indicated a low value of surface roughness (Ra) ranging from 0.05 to 0.07. Table 1 also shows the roughness of the surface of the substrate, which was surface-treated without the glazed glass layer. The results show a low value of surface roughness (Ra), ranging from about 0.13 to about 0.20 μm.

Based upon the aforementioned analysis, the glazed AlN substrate, according to the first embodiment of the present invention, exhibits superior properties for use in thermal heads thin film, circuit substrates, thick-film circuit substrates, and the like. Surface-treated substrates without the glazed glass layer can also be used in thin-film circuits boards, thick-film circuits boards, and similar substrates.

EXAMPLE 2

A suspension for $Al_2O_3$—$SiO_2$ layer 13 consisted of $Al_2O_3$—$SiO_2$ particles composed, by weight, of 33% $Al_2O_3$; 67% $SiO_2$. A glass paste was screen-printed on $Al_2O_3$—$SiO_2$ layer 13 after firing. Glass layer 14 was then formed by firing at a prescribed temperature. The chemical composition of each glass paste and the firing temperatures are shown in Table 2. The thickness of glass layer 14 after firing is 40 to 50 μm. The thicknesses of the other layers is the same as in the first example.

In this second example, the cross-sectional condition and the surface smoothness (glass layer surface) for each glazed AlN substrate manufactured were evaluated. Observation by SEM showed no indication that the glass component of any glazed AlN substrate penetrated into $Al_2O_3$—$SiO_2$ layer 13, surface oxidized layer 12, and the substrate of sintered AlN body 11. Further, each glass layer 14 was found to be free of bubbles, nor was there any unevenness on the surface, including blisters from the generation of bubbles. Similarly, evaluation of the surface smoothness of glass layer 14 by the surface roughness gauge shows good results in surface roughness: (Ra)=0.05 to 0.07 μm, as shown in Table 2.

Figure 2:
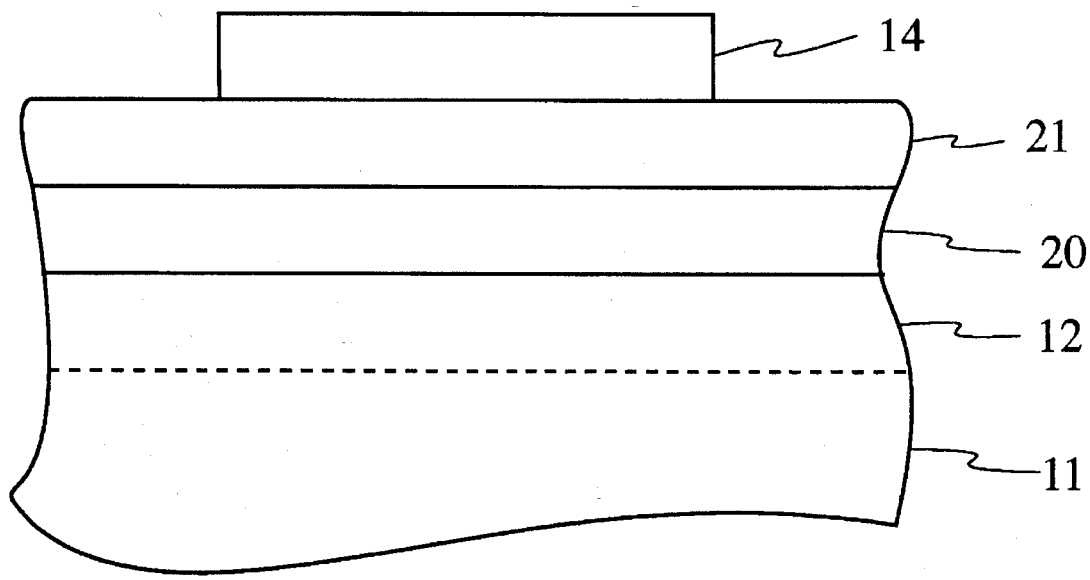
FIG. 2 is a cross-sectional view of a second embodiment of a glazed AlN substrate of the present invention.

Referring now to FIG. 2, a glazed AlN substrate 10' employs the same type of sintered AlN body 11 as in the first embodiment. Surface oxidized layer 12 formed on the surface of sintered AlN body 11 is also equivalent to that of the first embodiment.

An $Al_2O_3$—$SiO_2$ layer 20 is formed on surface oxidized layer 12 by spin coating using a suspension of $Al_2O_3$—$SiO_2$ particles. The $Al_2O_3$—$SiO_2$ suspension contains $Al_2O_3$ particles and $SiO_2$ particles whose sizes are the same as in the first embodiment. They are dispersed and fired at a temperature of from 900° C. to 1400° C. $Al_2O_3$—$SiO_2$ layer 20 contains, by weight, from about, 20 to about 75% $Al_2O_3$, with a balance substantially of $SiO_2$, i.e., from about 25 to 80% by weight. The thickness of $Al_2O_3$— $SiO_2$ layer 20 is from about 0.1 to about 20 μm. The compactness of $Al_2O_3$—$SiO_2$ layer 20 improves its strength and provides improved adhesion with surface oxidized layer 12. Furthermore, an undesirable reaction between glass layer 14 and sintered AlN body 11 is inhibited, as described below.

An $SiO_2$ layer 21 is formed by a sol-gel method on $Al_2O_3$—$SiO_2$ layer 20 and fired at a temperature of from 1000° C. to 1200° C. The thickness of $SiO_2$ layer 21 is from about 0.1 to about 2 μm. Alternatively, $SiO_2$ layer 21 may also be formed by sputtering. A glass layer 14 formed on $SiO_2$ layer 21 is the same as that described in the first embodiment. As previously described, a fusing reaction between $Al_2O_3$—$SiO_2$ layer 20 and $SiO_2$ layer 21, and glass layer 14, increases adhesion between $SiO_2$ layer 21 and glass layer 14. Thus it is possible to obtain strong, close adhesion between sintered AlN body 11 and glass layer 14. Furthermore, as in the first embodiment, an increase in the viscosity of glass adjacent to the interface between $SiO_2$ layer 21 and glass layer 14 prevents the penetration of the glass component of glass layer 14 into sintered AlN body 11. This makes it possible to fire glass with a high softening point at elevated temperatures to form glass layer 14 having improved surface smoothness.

Figure 3:
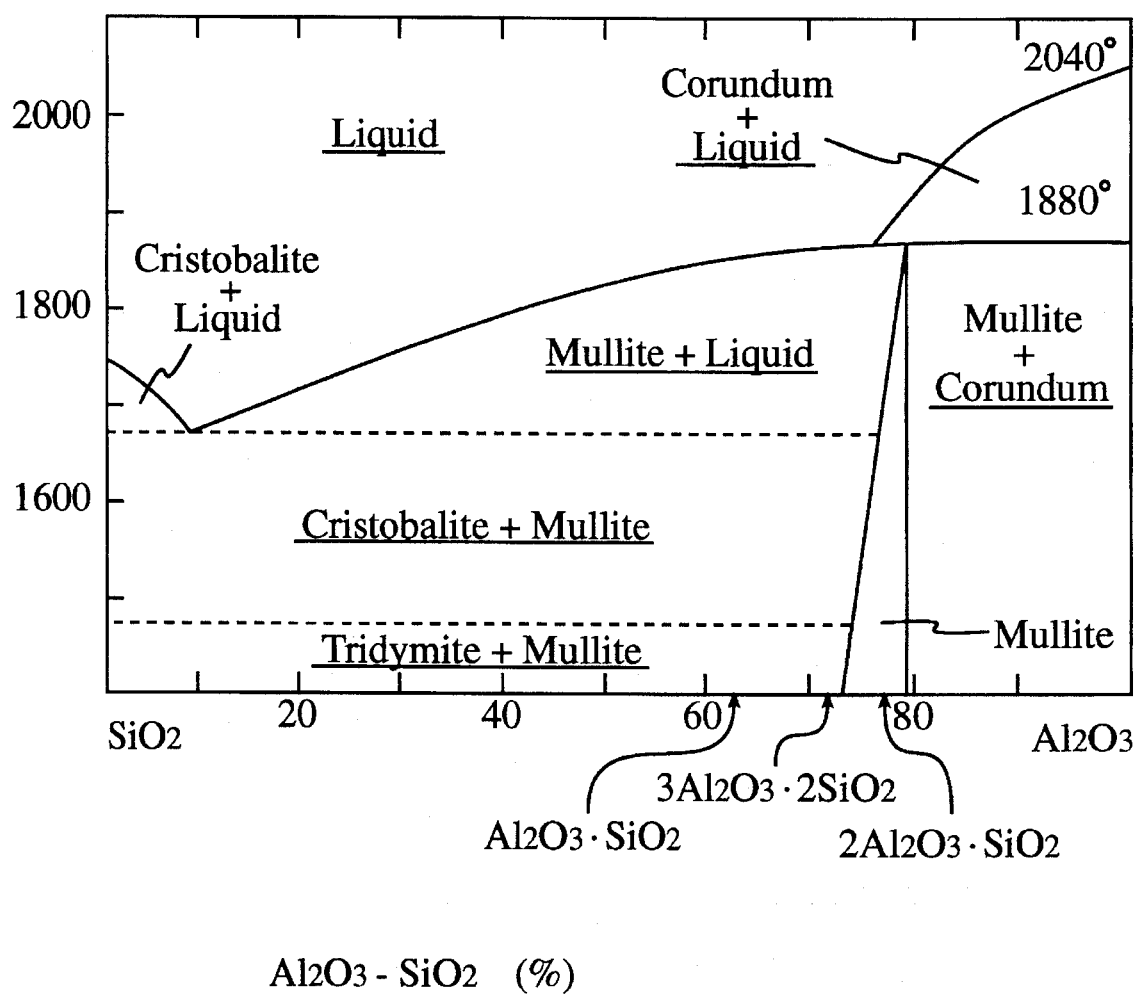
FIG. 3 shows an equilibrium diagram of an Al$_2$O$_3$—SiO$_2$ layer.

When the content of $Al_2O_3$ particles by weight in $Al_2O_3$—$SiO_2$ layer 20 is greater than 75%, and the content of $SiO_2$ particles in $Al_2O_3$—$SiO_2$ layer 20 is less than 25%, $Al_2O_3$—$SiO_2$ layer 20 after firing consists of a mixed phase of α-alumina (corundum) and mulite, as seen in the equilibrium diagram of $Al_2O_3$—$SiO_2$ shown in FIG. 3. As there exists no $SiO_2$ (Tridymite) phase, a fusing reaction with glass layer 14 in its softened phase does not occur.

As a consequence, the glass component of glass layer 14 penetrates into sintered AlN body 11. The resulting reaction between the glass component of glass layer 14 and sintered AlN body 11 promotes the formation of blisters on the surface of glass layer 14. On the other hand, when the content of $Al_2O_3$ particles by weight in $Al_2O_3$—$SiO_2$ layer 20 is less than 20%, and the content of $SiO_2$ particles in $Al_2O_3$—$SiO_2$ layer 20 is greater than 80%, the strength of $Al_2O_3$—$SiO_2$ layer 20 is reduced.

As a result, exfoliation of $Al_2O_3$—$SiO_2$ layer 20 from glazed AlN fractures on the surface of $Al_2O_3$—$SiO_2$ layer 20 after firing may occur, particularly when the thickness of $Al_2O_3$—$SiO_2$ layer 20 exceeds 2 μm.

When the thickness of $Al_2O_3$—$SiO_2$ layer 20 is less than 0.1 μm, there is a simultaneous decrease in the amount of $SiO_2$ in $Al_2O_3$—$SiO_2$ layer 20. A decrease in $SiO_2$ causes a poor fusing reaction between $Al_2O_3$—$SiO_2$ layer 20 and glass layer 14. This leads to penetration of the glass component of glass layer 14 into sintered AlN body 11, which causes a reaction between the glass component of glass layer 14 and sintered AlN body 11, resulting in the formation of blisters on glass layer 14. Conversely, when the thickness of $Al_2O_3$—$SiO_2$ layer 13 is greater than 20 μm, heat radiation of the glazed AlN substrate decreases.

When the thickness of $SiO_2$ layer 21 is less than 0.1 μm, there is a simultaneous decrease in the amount of $SiO_2$ in $SiO_2$ layer 21. A poor fusing reaction with glass layer 14 results from the decrease in $SiO_2$, thereby promoting the penetration of glass component of glass layer 14 while in its softened state into sintered AlN body 11. As a consequence, a reaction with sintered AlN body 11 causes the formation of blisters on the surface of glass layer 14. Conversely, when the thickness of $SiO_2$ layer 21 exceeds 2 μm, shrinking fractures may form on $SiO_2$ layer 21 in the process of firing.

The other properties are the same as those of the first embodiment.

The second embodiment of the present invention is described in detail with reference to the following example.

EXAMPLE

Sintered AlN body 11 was cut into a shape measuring 50 mm ×50 mm×0.8 mm and thermally oxidized at a temperature of 1300° C. to form an $Al_2O_3$ surface oxidized layer 12 having a thickness of 4.5 μm.

An $Al_2O_3$—$SiO_2$ layer 20 was then formed on $Al_2O_3$ surface oxidized layer 12 by spin coating, using a suspension consisting of $Al_2O_3$ and $SiO_2$ particles, and fired at a temperature of 1100° C. The mean sizes and composition of $Al_2O_3$ particles and $SiO_2$ particles in the suspension are shown in Table 3.

Further, a $SiO_2$ layer 21 was formed by a sol-gel method on $Al_2O_3$—$SiO_2$ layer 20 and fired at a temperature of 1100° C. A glass paste was screen-printed on $SiO_2$ layer 21 after firing formation.

The glass paste was fired at a temperature of 1200° C. to form glass layer 14 having a thickness is 40 to 50 μm. The glass used to form glass layer 14 contained, by weight, about 55% $SiO_2$; 15% $Al_2O_3$; 20% PbO; 5% $B_2O_3$; 5% CaO.

The conditions of the interface between glass layer 14 and $SiO_2$ layer 21, and the surface properties of glass layer 14, were observed by SEM for each glazed AlN substrate 10' manufactured. There was no indication that the glass component of softened glass layer 14 penetrated into sintered AlN body 11 in any glazed AlN substrates produced, except for Structure 2-1, Structure 2-5, Structure 2-6, Structure 2-9, Structure 2-10, and Structure 1-13. Further, no bubbles were observed in glass layer 14, which also showed no blisters on its surface. The surface smoothness of glass layer 14 was further evaluated by a surface roughness gauge. The results indicated a low value of surface roughness (Ra), ranging from 0.04 to 0.6 μm, as shown in Table 3.

Table 3 also shows roughness of the surface of the substrate, which was surface-treated without the glazed-glass layer. These results indicate a low value of surface roughness (Ra), ranging from about 0.07 to 0.10 μm. Glazed AlN substrate, according to the second embodiment of the present invention, exhibited superior properties for use in thermal heads, thin-film circuit substrates, thick-film hybrid IC circuit substrates, and the like. The surface-treated substrates without the glazed-glass layer can be used in thin-film circuit boards, thick-film circuit boards, and similar substrates.

According to an embodiment of the present invention, the use of a sintered AlN body as a substrate provides excellent heat radiating properties. The interposition of a surface oxidized layer as a surface layer of a sintered AlN body increases adhesion between an $Al_2O_3$—$SiO_2$ layer and the sintered AlN body. Thickness of the $Al_2O_3$—$SiO_2$ layer may be increased without generating cracks. Further, the strength of the $Al_2O_3$—$SiO_2$ layer is substantially improved over prior art $SiO_2$ layers.

Accordingly, a glass layer of greater thickness may be formed on the $Al_2O_3$—$SiO_2$ layer from a glass having a high softening point, since firing at elevated temperatures does not produce a reaction between the glass layer and the sintered AlN body. Superior surface smoothness is attained in a circuit substrate suitable for use in thermal heads and the like. Even without a glazed glass layer, AlN substrates with an oxidized layer and an $Al_2O_3$—$SiO_2$ layer can be used for thin-film circuit boards, thick-film circuit boards, and similar substrates.

Further, according to another embodiment of the present invention, the thickness of $Al_2O_3$—$SiO_2$ layer may be reduced, while increasing the content of $Al_2O_3$ and $SiO_2$ in the $Al_2O_3$—$SiO_2$ layer. As a result, the range of applications may be expanded.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

TABLE 1

Properties of $Al_2O_3$, $SiO_2$ and $Al_2O_3$—$SiO_2$ and evaluation results after formation of glass layer (Structure 1).

| Structure | Mean particle size (μm) $Al_2O_3$ | Mean particle size (μm) $SiO_2$ | Content (wt %) $Al_2O_3$ | Content (wt %) $SiO_2$ | $Al_2O_3$—$SiO_2$ Thickness (μm) | $SiO_2$ Thickns (μm) | Existance of buble ( : O, : X) | Surface Roughnes 1: Ra (μm) | Surface Roughness 2.w/out gl Ra (μm) |
|---|---|---|---|---|---|---|---|---|---|
| 1-1 | 0.03 | 0.02 | 40.0 | 60.0 | 4.6 | 0.0 | X | 0.45 | 0.36 |
| 1-2 | 0.06 | 0.05 | 40.0 | 60.0 | 4.5 | 0.0 | O | 0.05 | 0.18 |
| 1-3 | 0.25 | 0.30 | 40.0 | 60.0 | 4.8 | 0.0 | O | 0.05 | 0.20 |
| 1-4 | 0.96 | 0.93 | 40.0 | 60.0 | 4.6 | 0.0 | O | 0.05 | 0.16 |
| 1-5 | 1.95 | 2.15 | 40.0 | 60.0 | 4.7 | 0.0 | X | 0.35 | 0.37 |
| 1-6 | 0.25 | 0.30 | 10.0 | 90.0 | 4.7 | 0.0 | X | 0.48 | 0.40 |
| 1-7 | 0.25 | 0.30 | 20.0 | 80.0 | 4.5 | 0.0 | O | 0.06 | 0.16 |
| 1-8 | 0.25 | 0.30 | 50.0 | 50.0 | 4.5 | 0.0 | O | 0.06 | 0.15 |
| 1-9 | 0.25 | 0.30 | 80.0 | 20.0 | 4.6 | 0.0 | X | 0.33 | 0.58 |
| 1-10 | 0.25 | 0.30 | 40.0 | 60.0 | 0.07 | 0.0 | X | 0.55 | 0.45 |
| 1-11 | 0.25 | 0.30 | 40.0 | 60.0 | 0.5 | 0.0 | O | 0.06 | 0.15 |
| I-12 | 0.25 | 0.30 | 40.0 | 60.0 | 19.8 | 0.0 | O | 0.07 | 0.13 |
| I-13 | 0.25 | 0.30 | 40.0 | 60.0 | 28.9 | 0.0 | X | 0.47 | 0.27 |

O: negative
X: positive,
Roughness 1: with glass
Roughness 2: without glass

TABLE 2

Chemical Composition of Glass

| Glass | Chemical Composition (wt. %) | | | | | | | | | Burning (°C.) | Surface Roughness Ra (μm) |
|---|---|---|---|---|---|---|---|---|---|---|---|
| | SiO2 | Al2O3 | B2O3 | MgO | CaO | SrO | BaO | ZnO | PbO | | |
| 1 | 55.0 | 15.0 | 5.0 | 25.0 | 0.0 | 0.0 | 0.0 | 0.0 | 0.0 | 1200 | 0.05 |
| 2 | 55.0 | 20.0 | 5.0 | 0.0 | 20.0 | 0.0 | 0.0 | 0.0 | 0.0 | 1200 | 0.06 |
| 3 | 60.0 | 15.0 | 5.0 | 0.0 | 0.0 | 20.0 | 0.0 | 0.0 | 0.0 | 1250 | 0.06 |
| 4 | 48.0 | 13.0 | 5.0 | 0.0 | 0.0 | 0.0 | 30.0 | 0.0 | 0.0 | 1200 | 0.05 |
| 5 | 55.0 | 15.0 | 5.0 | 0.0 | 0.0 | 0.0 | 0.0 | 25.0 | 0.0 | 1250 | 0.07 |
| 6 | 50.0 | 20.0 | 5.0 | 0.0 | 0.0 | 0.0 | 0.0 | 0.0 | 25.0 | 1150 | 0.05 |
| 7 | 55.0 | 15.0 | 5.0 | 10.0 | 15.0 | 0.0 | 0.0 | 0.0 | 0.0 | 1250 | 0.06 |
| 8 | 55.0 | 15.0 | 5.0 | 0.0 | 15.0 | 0.0 | 10.0 | 0.0 | 0.0 | 1250 | 0.05 |
| 9 | 55.0 | 15.0 | 5.0 | 0.0 | 10.0 | 5.0 | 10.0 | 0.0 | 0.0 | 1250 | 0.06 |

TABLE 3

Properties of $Al_2O_3$, $SiO_2$ and $Al_2O_3$—$SiO_2$ and evaluation results after formation of glass layer (Structure 2).

| Structure | Mean particle size (μm) | | Content (wt %) | | $Al_2O_3$—$SiO_2$ Thickness (μm) | $SiO_2$ Thkn (μm) | Existance of buble ( : O, : X) | Surface Roughness 1: Ra (μm) | Surface Roughnes 2. Ra (μm) |
|---|---|---|---|---|---|---|---|---|---|
| | $Al_2O_3$ | $SiO_2$ | $Al_2O_3$ | $SiO_2$ | | | | | |
| 2-1 | 0.25 | 0.30 | 10.0 | 90.0 | 2.5 | 1.5 | X | 0.56 | 0.28 |
| 2-2 | 0.25 | 0.30 | 20.0 | 80.0 | 2.4 | 1.4 | O | 0.06 | 0.07 |
| 2-3 | 0.25 | 0.30 | 40.0 | 60.0 | 2.7 | 1.5 | O | 0.06 | 0.09 |
| 2-4 | 0.25 | 0.30 | 75.0 | 25.0 | 2.4 | 1.5 | O | 0.05 | 0.09 |
| 2-5 | 0.25 | 0.30 | 90.0 | 10.0 | 2.5 | 1.4 | X | 0.41 | 0.24 |
| 2-6 | 0.25 | 0.30 | 40.0 | 60.0 | 0.05 | 1.5 | X | 0.46 | ).@% |
| 2-7 | 0.25 | 0.30 | 40.0 | 60.0 | 0.10 | 1.3 | O | 0.06 | 0.10 |
| 2-8 | 0.25 | 0.30 | 40.0 | 60.0 | 19.2 | 1.5 | O | 0.06 | 0.08 |
| 2-9 | 0.25 | 0.30 | 40.0 | 60.0 | 25.6 | 1.4 | X | 0.38 | 0.22 |
| 2-10 | 0.25 | 0.30 | 40.0 | 60.0 | 2.6 | 0.08 | X | 0.54 | 0.21 |
| 2-11 | 0.25 | 0.30 | 40.0 | 60.0 | 2.4 | 0.11 | O | 0.04 | 0.08 |
| 2-12 | 0.25 | 0.30 | 40.0 | 60.0 | 2.4 | 1.9 | O | 0.06 | 0.10 |
| 2-13 | 0.25 | 0.30 | 40.0 | 60.0 | 2.3 | 3.8 | X | 0.44 | 0.24 |

O: negative,
X: positive,
Roughness 2: without glass

What is claimed is:

1. A method for producing a glazed AlN substrate, comprising:

preparing an AlN sintered body;

thermally oxidizing said AlN sintered body to form a surface oxidized layer thereon, wherein said surface oxidized layer ranges in thickness from 0.2 to 20 μm;

forming an $Al_2O_3$—$SiO_2$ layer on said surface oxidized layer;

said $Al_2O_3$—$SiO_2$ layer includes from about 20 to about 50% $Al_2O_3$ weight percent;

said $Al_2O_3$—$SiO_2$ layer includes from about 80 to about 50% $SiO_2$ weight percent; and forming a glass layer on said $Al_2O_3$—$SiO_2$ layer.

2. The method for producing a glazed AlN substrate according to claim 1, wherein:

said step of thermally oxidizing said AlN sintered body to form a surface oxidized layer includes heat treating said AlN sintered body at a temperature sufficient to oxidize said AlN sintered body in an atmosphere of oxygen and steam.

3. The method for producing a glazed AlN substrate according to claim 2, wherein:

said temperature ranges from about 1100° to 1500° C.

4. The method for producing a glazed AlN substrate according to claim 1, wherein:

said step of forming an $Al_2O_3$—$SiO_2$ layer on said surface oxidized layer includes dispersing a suspension of $Al_2O_3$ and $SiO_2$ particles; and firing said suspension at a temperature of from 900° to 1400° C.

5. The method for producing a glazed AlN substrate according to claim 4, wherein:

said $Al_2O_3$ and $SiO_2$ particles each include particle sizes of from 0.05 to 5 μm.

6. The method for producing a glazed AlN substrate according to claim 1, wherein:

said step of forming a glass layer includes forming said glass to a thickness of at least 30 μm.

7. The method for producing a glazed AlN substrate according to claim 1, wherein:

said glass layer includes about 30 to 70 weight percent $SiO_2$;

from 10 to 40 weight percent $Al_2O_3$;

from 1 to 10 weight percent $B_2O_3$;

from 10 to 40 weight percent of a metal oxide; and said metal oxide includes at least one member selected from the group consisting of MgO, CaO, SrO, BaO, ZnO, and PbO.

8. The method for producing a glazed AlN substrate according to claim 1, wherein:

said glass layer includes a coefficient of thermal expansion of from about $3.4\times10^{-6}$ about $5.4\times10^{-6}/°C$.

9. The method for producing a glazed AlN substrate according to claim 1, wherein:

said step of preparing an AlN sintered body includes preparing an AlN sintered body having a thermal conductivity of at least 160 W/m.K; and a coefficient of thermal expansion of $4.4\times10^{-6}/°C$.

10. A method for producing a glazed AlN substrate, comprising:

preparing an AlN sintered body;

thermally oxidizing said AlN sintered body to form a surface oxidized layer thereon; wherein said surface oxidized layer ranges in thickness from 0.2 to 20 μm;

laminating forming an $Al_2O_3$—$SiO_2$ layer on said surface oxidized layer;

said $Al_2O_3$—$SiO_2$ layer includes from about 20 to about 75% $Al_2O_3$ weight percent;

said $Al_2O_3$—$SiO_2$ layer includes from about 80 to about 25% $SiO_2$ weight percent;

forming an $SiO_2$ layer on said $Al_2O_3$—$SiO_2$ layer; and forming a glass layer on said $SiO_2$ layer.

11. The method for producing a glazed AlN substrate according to claim 10, wherein:

said step of thermally oxidizing said AlN sintered body to form a surface oxidized layer includes heat treating said AlN sintered body at a temperature sufficient to oxidize said AlN sintered body in an atmosphere of oxygen and steam.

12. The method for producing a glazed AlN substrate according to claim 11, wherein:

said temperature ranges from 1100° to 1500° C.

13. The method for producing a glazed AlN substrate according to claim 10, wherein:

said step of forming an $Al_2O_3$—$SiO_2$ layer on said surface oxidized layer includes dispersing a suspension of $Al_2O_3$ and $SiO_2$ particles; and firing said suspension at a temperature of from 900° to 1400° C.

14. The method for producing a glazed AlN substrate according to claim 13, wherein:

said $Al_2O_3$—$SiO_2$ particles include particle sizes of 0.05 to 5 μm.

15. The method for producing a glazed AlN substrate according to claim 10, wherein:

said step of forming a glass layer includes forming said glass to a thickness of at least 30 μm.

16. The method for producing a glazed AlN substrate according to claim 10, wherein:

said glass layer includes from 30 to 70 percent by weight $SiO_2$, 10 to 40 percent by weight $Al_2O_3$, 1, to 10 percent by weight $B_2O_3$, 10 to 40 percent by weight of a metal oxide; and said metal oxide includes at least one selected from the group consisting of MgO, CaO, SrO, BaO, ZnO, and PbO.

17. The method for producing a glazed AlN substrate according to claim 10, wherein:

said glass layer includes a coefficent of thermal expansion of from about $3.4\times10^{-6}$ to about $5.4\times10^{-6}/°C$.

18. The method for producing a glazed AlN substrate according to claim 10, wherein:

said step of preparing an AlN sintered body includes preparing an AlN sintered body having a thermal conductivity of at least 160 W/m.K; and a coefficient of thermal expansion of $4.4\times10^{-6}/°C$.

* * * * *